Patented July 27, 1948

2,445,817

UNITED STATES PATENT OFFICE 2,445,817

PREPARATION OF LEUCINE

Sydney Archer, Albany, and Noel F. Albertson, East Greenbush, N. Y., assignors, by mesne assignments, to Winthrop-Stearns Inc., New York, N. Y., a corporation of Delaware No Drawing. Application September 22, 1944, Serial No. 555,403

4 Claims. (Cl. 260—482)

This invention relates to a process for the preparation of alpha-amino acids, and to intermediates for the preparation thereof.

The malonic ester synthesis previously has been adapted to the preparation of a number of alpha-amino acids, among these being leucine, isoleucine, norleucine, methionine, phenylalanine, valine, histidine, proline, and lysine. A useful modification of this method involves condensing an alkyl or aralkyl halide with the sodio derivative of an ethyl acylaminomalonate and then hydrolyzing and decarboxylating the condensation product to yield the amino acid. The ethyl acylaminomalonates which previously have been used in this process are aromatic compounds, namely ethyl phthalimidomalonate [Sörenson, Zeit. Physiol. Chem., 44, 448–460 (1905)] and ethyl benzamidomalonate [Redemann and Dunn, J. Biol. Chem., 130, 341–348 (1939)].

When, however, this method is utilized for the preparation of aliphatic amino acids certain drawbacks are encountered. For example, many of the requisite saturated alkyl halides are relatively difficult to obtain pure.

We have found that these drawbacks can be overcome by using, instead of the saturated alkyl halides, the $\beta,\gamma$-unsaturated halides, and subsequently reducing the double bond in the condensation product. This procedure, although at first sight longer in involving an additional step, has many advantages. In contrast to the saturated alkyl halides, the requisite unsaturated halides in many instances can more readily be obtained pure, and hence are much cheaper. Moreover, they react with much greater facility.

Our process comprises condensing, in the presence of an alkaline condensing agent, for example, an alkali metal alcoholate, a $\Delta^2$-alkenyl halide having the formula

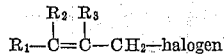

where $R_1$, $R_2$, and $R_3$ represent hydrogen or an alkyl group, with an active-hydrogen compound such as an alkyl acylaminomalonate, catalytically reducing the condensation product, and hydrolyzing and decarboxylating the reduction product to yield an alpha-amino acid. The reactions involved in our process can be represented by the following equations:

in which $R_1$, $R_2$, and $R_3$ represent hydrogen or an alkyl group and $R_4$ represents an alkyl group.

As the alkyl acylaminomalonate in our process we prefer to employ a lower aliphatic acylamino derivative. For example, the use of ethyl acetylaminomalonate has a definite advantage over the use of the corresponding phthaloyl and benzoyl compounds, in that the subsequent removal of the acetyl group in the process leads to the formation of acetic acid rather than phthalic or benzoic acid. These latter acids, being solids, require additional purification steps to remove them from the alpha-amino acid in contrast with acetic acid, which, being a volatile, water-soluble liquid, can be quite simply separated from the desired product.

The catalytic reduction can be conveniently carried out by treatment with hydrogen at 2–3 atmospheres in the presence of a nickel catalyst, such as Raney nickel. The hydrolysis and decarboxylation steps can be effected simultaneously by refluxing the reduction product with mineral acid, preferably concentrated hydrobromic acid.

In its broader aspects our invention comprehends condensing a $\Delta^2$-alkenyl halide with a compound having the formula

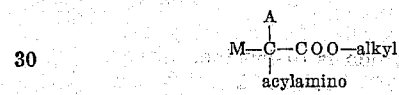

where M represents one equivalent of a member of the class consisting of alkali and alkaline earth metals and A is carbalkoxy, acyl, or cyano, and converting the resulting compound into an alpha-amino acid by an appropriate sequence of hydrolysis and reduction steps. When A is carbalkoxy, the process can be conducted satisfactorily regardless of the order of the hydrolysis and reduction steps, although it is preferable to reduce the condensation product prior to hydrolysis. If, however, A is acyl or cyano, since these groups are themselves susceptible to reduction, an undesirable mixture of products frequently results if the hydrogenation is conducted prior to removal of these groups by hydrolysis. For this reason these groups are removed by hydrolysis prior to carrying out the reduction.

The following examples illustrate our invention without, however, limiting it thereto.

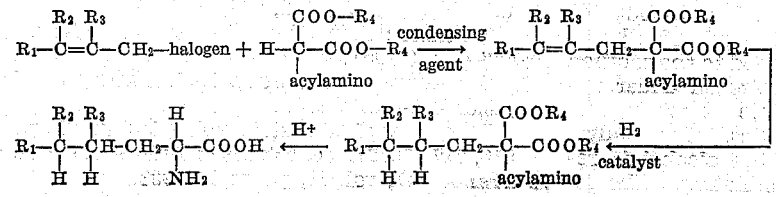

Example 1

Five and nine-tenths grams of 3-chloro-2-methyl-propene are added dropwise with stirring to a solution of 10.9 g. of ethyl acetylaminomalonate in 100 ml. of anhydrous ethanol to which 1.15 g. of sodium have been added and the mixture is then refluxed for six hours. The alcohol is removed in vacuo and to the pale yellow residue are added 25 ml. of water and 25 ml. of chloroform. The water layer is separated and is extracted with a 20 ml. and a 10 ml. portion of chloroform. The chloroform extracts are combined and the chloroform removed by distillation. The residue consists of approximately 11.6 g. of pale yellow crystals. For purification, the crystals are dissolved in 10 ml. of benzene and 50 ml. of petroleum ether is added to the solution. The compound separates from the solution and is collected on a filter. The purified product, which is ethyl 2-acetylamino-2-carbethoxy-4-methyl-4-pentenoate weighs approximately 10.7 g. It melts at approximately 92–93° C.

Ten and seven-tenths grams of ethyl 2-acetylamino-2-carbethoxy-4-methyl-4-pentenoate are dissolved in 100 ml. of ethanol and 0.5 g. of Raney nickel is added. The mixture is treated with hydrogen under approximately 40 pounds pressure at room temperature for twenty minutes. The catalyst is then removed by filtration and the alcohol is removed by distillation. The residue, which is ethyl 2-acetylamino-2-carbethoxy-4-methylpentanoate, weighs approximately 10.7 g. The compound melts at approximately 84° C.

To 5.46 g. of ethyl 2-acetylamino-2-carbethoxy-4-methylpentanoate are added 16 ml. of 48% hydrobromic acid and the solution is refluxed for seven hours. The solution is then boiled with charcoal, cooled and filtered. The filtrate is adjusted to pH 6 by the addition of concentrated ammonia water. The mixture is cooled for several hours and the precipitate which forms is collected on a filter. Five milliliters of water are added to the solid and then 5 ml. of ethanol. The mixture is cooled and the insoluble material is collected on a filter. The solid weighs 2.10 g. The product, which is dl-leucine, decomposes at approximately 278–283° C. It forms an N-benzoyl derivative which melts at 138–141° C.

Example 2

Fifteen and seven-tenths grams of allyl bromide are added dropwise with stirring to a solution of 21.7 g. of ethyl acetylaminomalonate in 200 ml. of anhydrous ethanol to which 2.3 g. of sodium have been added. The solution is refluxed for six hours and the alcohol is then removed in vacuo. To the residue are added 40 ml. of water and 50 ml. of chloroform. The water layer is separated and is extracted with a 40 ml. and a 20 ml. portion of chloroform. The chloroform extracts are combined and the chloroform is removed therefrom by distillation. The residue is a viscous, yellow liquid weighing 23.5 g. This material crystallizes as white needles from a benzene-petroleum ether mixture. The purified product which is ethyl 2-acetylamino-2-carbethoxy-4-pentenoate melts at 46° C.

2.2 g. of ethyl 2-acetylamino-2-carbethoxy-4-pentenoate are dissolved in 100 ml. of ethanol and 0.5 g. of Raney nickel is added to the solution which is then treated with hydrogen under approximately 40 pounds pressure at room temperature for about twenty minutes. The catalyst is removed by filtration and the alcohol is removed from the filtrate by distillation. The residue is recrystallized from water. The purified product, which is ethyl 2-acetylamino-2-carbethoxypentanoate, weighs 2.2 g. It melts at 94° C.

One and forty-four hundredths grams of ethyl 2-acetylamino-2-carbethoxypentanoate are placed in 8 ml. of 48% hydrobromic acid solution and the mixture is refluxed for nine hours. The solution is then boiled with charcoal, filtered and the filtrate evaporated to dryness. The residue is treated with 5 ml. of anhydrous ethanol and the solution is filtered. The product, norvaline, is precipitated from the filtrate by the addition of pyridine. The yield is approximately 0.31 gram. The hydrochloride decomposes at 184–188° C. In the following claims the term "lower fatty acyl" denotes a group derived from a lower fatty acid by removal of —OH from the carboxyl group.

We claim:

1. The process for preparing dl-leucine which comprises condensing a methallyl halide with a compound having the formula

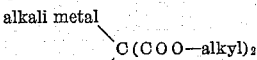

wherein the lower fatty acyl group is derived from a volatile, water-soluble lower fatty acid by removal of —OH from the carboxyl group, hydrogenating the condensation product and hydrolyzing and decarboxylating the hydrogenation product by heating it with strong mineral acid.

2. The process for preparing dl-leucine which comprises condensing methallyl chloride with ethyl acetamidosodiomalonate, hydrogenating the condensation product and hydrolyzing and decarboxylating the hydrogenation product by heating it with concentrated hydrobromic acid solution.

3. Ethyl 2 - acetylamino - 2 - carbethoxy - 4 - methyl-4-pentenoate.

4. The process for preparing dl-leucine which comprises condensing a methallyl halide with a compound having the formula

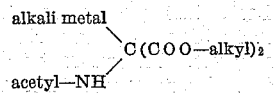

hydrogenating the condensation product and hydrolyzing and decarboxylating the hydrogenation product by heating it with strong mineral acid.

SYDNEY ARCHER.
NOEL F. ALBERTSON.

REFERENCES CITED

The following references are of record in the file of this patent:

UNITED STATES PATENTS

| Number | Name | Date |
| --- | --- | --- |
| 1,239,867 | Blagden | Sept. 11, 1917 |
| 1,844,394 | Jaeger | Feb. 9, 1932 |
| 2,166,971 | Schmidt et al. | July 25, 1939 |

OTHER REFERENCES

Karrer et al.: "Helv. Chim. Acta.," vol. 18 (1935) pages 782, 783, 788.

Sorenson: Zeit. Physiol. Chem., vol. 44, pages 448–460 (1905).

Redemann et al.: Jour. Biol. Chem., vol. 130, pages 341–348 (1939).

Locquin et al.: Beilstein, vol. 4, 2nd suppl., pages 915, 917 (1942). (Abstract of Bull. Soc. Chim. de France (4), vol. 43, pages 932–933.)